US008286187B2

(12) United States Patent
Hou et al.

(10) Patent No.: US 8,286,187 B2
(45) Date of Patent: Oct. 9, 2012

(54) RESOURCE MANAGEMENT SYSTEM AND METHOD

(75) Inventors: Ting-Wei Hou, Tainan (TW);
Pang-Chieh Wang, Kaohsiung (TW);
Yi-Shuan Hung, Tainan County (TW);
Sheng-An Jang, Pingtung (TW);
Cheng-Liang Lin, Kaohsiung (TW);
Wen-Wei Lin, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 1168 days.

(21) Appl. No.: 12/127,679

(22) Filed: May 27, 2008

(65) Prior Publication Data

US 2008/0320483 A1 Dec. 25, 2008

(30) Foreign Application Priority Data

Jun. 20, 2007 (TW) .............................. 96122113 A

(51) Int. Cl.
*G06F 9/44* (2006.01)
*G06F 9/445* (2006.01)
*G06F 9/46* (2006.01)
*G06F 3/00* (2006.01)
*G06F 13/00* (2006.01)

(52) U.S. Cl. ........ 719/311; 719/319; 719/328; 719/329; 717/168; 717/174; 718/104

(58) Field of Classification Search ........................ None
See application file for complete search history.

(56) References Cited

U.S. PATENT DOCUMENTS

| 6,049,798 | A | 4/2000 | Bishop et al. |
| 6,112,301 | A | 8/2000 | Johnson |
| 6,615,166 | B1 * | 9/2003 | Guheen et al. .................. 703/27 |
| 6,950,912 | B2 | 9/2005 | Oldfield et al. |
| 7,010,661 | B2 | 3/2006 | Kamel et al. |
| 2003/0014521 | A1 * | 1/2003 | Elson et al. .................... 709/225 |
| 2003/0061261 | A1 | 3/2003 | Greene |
| 2005/0193119 | A1 * | 9/2005 | Hayes, Jr. ..................... 709/227 |
| 2005/0223101 | A1 | 10/2005 | Hayes, Jr. |

FOREIGN PATENT DOCUMENTS

EP 0945792 A2 9/1999
(Continued)

OTHER PUBLICATIONS

Taiwan Patent Office, Office Action, Patent Application Serial No. 096122113, Dec. 27, 2010, Taiwan.
(Continued)

*Primary Examiner* — Emerson Puente
*Assistant Examiner* — Jonathan R Labud

(57) ABSTRACT

Resource management system is provided, implemented between a service bundle developer and provider and a service bundle user. A resource requirement determining device determines a system resource requirement for a service bundle provided by the service bundle developer and provider, and generates resource requirement information corresponding to the service bundle. A processor receives information of system resource utilization status from the service bundle user, determines whether available resource of the service bundle user is sufficient for the resource requirement of the service bundle, when the available resource of the service bundle user is insufficient, the processor generates a waiting queue, and adds the service bundle into the waiting queue. When available resource of the service bundle user is sufficient, the processor installs the service bundle specified in the waiting queue in the service user. A storage device stores the waiting queue and corresponding resource requirement information.

14 Claims, 5 Drawing Sheets

FOREIGN PATENT DOCUMENTS

| | | |
|---|---|---|
| TW | 200629152 | 8/2006 |
| TW | 200700997 | 1/2007 |

OTHER PUBLICATIONS

Taiwan Patent Office, Office Action, Patent Application Serial No. 096122113, Jul. 14, 2011, Taiwan.

Dave Marples et al., "The Open Services Gateway Initiative: An Introductory Overview," IEEE Communications Magazine, Dec. 2001, pp. 110-114, IEEE, US.

Almut Herzog, "Secure Execution Environment for Java Electronic Services," Nov. 2002, 120 pages, Sweden.

Karl Czajkowski et al., "Agreement-Based Resource Management," Proceedings of the IEEE, Mar. 2005, vol. 93, No. 3, IEEE, US.

* cited by examiner

RESOURCE MANAGEMENT SYSTEM AND METHOD

RELATED APPLICATIONS

Reference is hereby made to the following Taiwan. patent applications: Ser. No. 96122113 (filed 20 Jun. 2007), the disclosure of the application is incorporated herein by reference.

BACKGROUND

The invention relates to system resource management.

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Recently, various digital appliances, domestic network appliances, and embedded digital information application systems are common. OSGi (Open System Gateway initiative) is the most common type of open service platform and gateway used in domestic network. The OSGi provides an open and extensible platform protocol, enabling a complete open service platform and a service-oriented framework.

Generally, an open service platform is implemented in an embedded hardware system. It is common for an embedded system having limited resources to cooperate with various service providers. Accordingly, for this type of open service platform, the efficiency of managing the resources is the key for smooth operation.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Resource management system is provided, implemented between a service bundle developer and provider and a service bundle user. A resource requirement determining device determines a system resource requirement for a service bundle provided by the service bundle developer and provider, and generates resource requirement information corresponding to the service bundle. A processor receives information of system resource utilization status from the service bundle user, determines whether available resource of the service bundle user is sufficient for the resource requirement of the service bundle according to the resource requirement information of the service bundle developer and provider and the information of system resource utilization status of the service bundle user, when the available resource of the service bundle user is insufficient for the resource requirement of the service bundle, the processor generates a waiting queue, and adds the service bundle into the waiting queue. When available resource of the service bundle user is sufficient for the resource requirement of the service bundle, the processor installs the service bundle specified in the waiting queue in the service user. A storage device stores the waiting queue and corresponding resource requirement information.

Also provided is a resource management method. A system resource requirement for a service bundle provided by a service bundle developer and provider is determined. Resource requirement information corresponding to the service bundle is generated. Information of system resource utilization status is received from a service bundle user. It is determined whether available resource of the service bundle user is sufficient for the resource requirement of the service bundle according to the resource requirement information of the service bundle developer and provider and the information of system resource utilization status of the service bundle user. When the available resource of the service bundle user is insufficient for the resource requirement of the service bundle, a waiting queue is generated, and the service bundle is added into the waiting queue. When the available resource of the service bundle user is sufficient for the resource requirement of the service bundle, the service bundle specified in the waiting queue is installed in the service bundle user.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that the many of the elements described and illustrated throughout the specification are functional in nature and may be embodied in one or more physical entities or may take other forms beyond those described or depicted.

Figure 1:
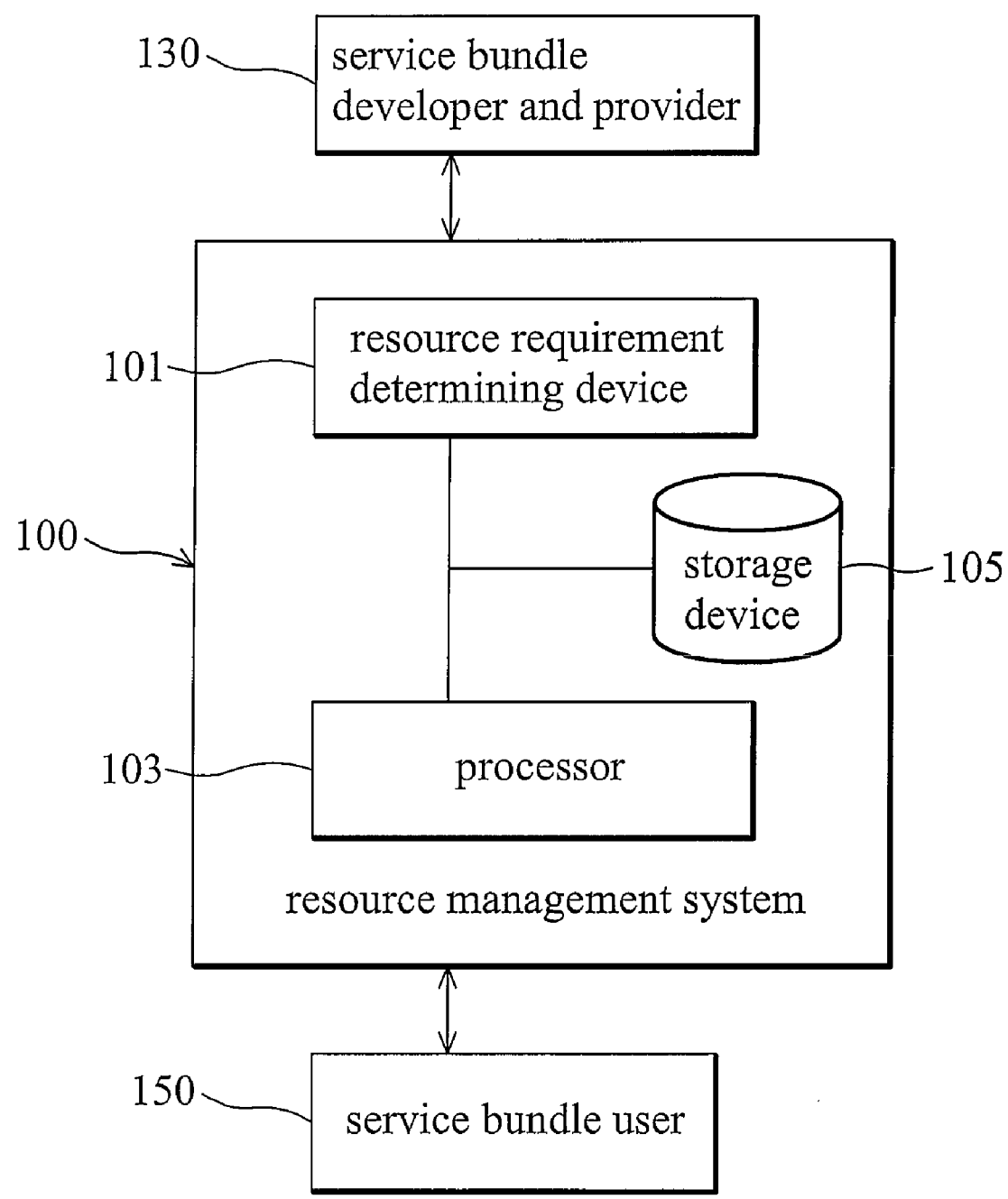
FIG. 1 illustrates a schematic view of an embodiment of a resource management system.

FIG. 1 illustrates a schematic view of an embodiment of a resource management system. Resource management system 100 is connected to a service bundle developer and provider 130 and a service bundle user 150, respectively. The service bundle developer and provider 130, a developer of a service bundle, provides a service bundle for service bundle user 150. The resource management system 100 is an operator. The service bundle user 150 is an embedded OSGi (Open System Gateway initiative) gateway. The service bundles developed by service bundle developer and provider 130 are first verified by resource management system 100, and then the verified service bundles are installed in the OSGi gateway of service bundle user 150.

The resource management system 100 comprises a resource requirement determining device 101, a processor 103, and a storage device 105.

When the service bundle developer and provider 130 provides a service bundle, the resource requirement determining device 101 first determines a system resource requirement for a service bundle provided by the service bundle developer and provider 130, and the resource requirement determining device 101 generates resource requirement information corresponding to the service bundle. The system resource requirement for the service bundle determined by the resource requirement determining device 101 comprises memory requirement for the service bundle, input/output device requirement and dependency on other service bundles of the service bundle, and computing resource requirement of the service bundle. The resource requirement determining device 101 further generates information specifying resource requirement, comprising information specifying memory requirement, input/output device requirement and dependency on other service bundles, and computing resource requirement of the service bundle.

The processor 103 receives information of system resource utilization status from the service bundle user 150, and determines whether available resource of the service bundle user 150 is sufficient for the resource requirement of the service bundle according to the resource requirement information of the service bundle and the information of system resource utilization status of the service bundle user 150. The information of system resource utilization status of the service bundle user 150 received by the processor 103 comprises: a list of service bundles which have been installed, and information specifying total system resources of the service bundle user 150. When the available resource of the service bundle user 150 is insufficient for the resource requirement of the service bundle, the processor 103 generates a waiting queue and adds the service bundle into the waiting queue; when the available resource of the service bundle user 150 is sufficient for the resource requirement of the service bundle, the processor 103 installs the service bundle specified in the waiting queue in the service bundle user 150. For the service bundles in the waiting queue, the processor 103 further determines whether available resource of the service bundle user becomes sufficient for the resource requirement of the service bundle according to a preset period, and when the available resource of the service bundle user is sufficient for the resource requirement of the service bundle, installs the service bundle specified in the waiting queue in the service bundle user 150. The preset period can be different corresponding to different service bundles.

The storage device 105 stores the waiting queue and the corresponding system resource requirement.

Figure 2:
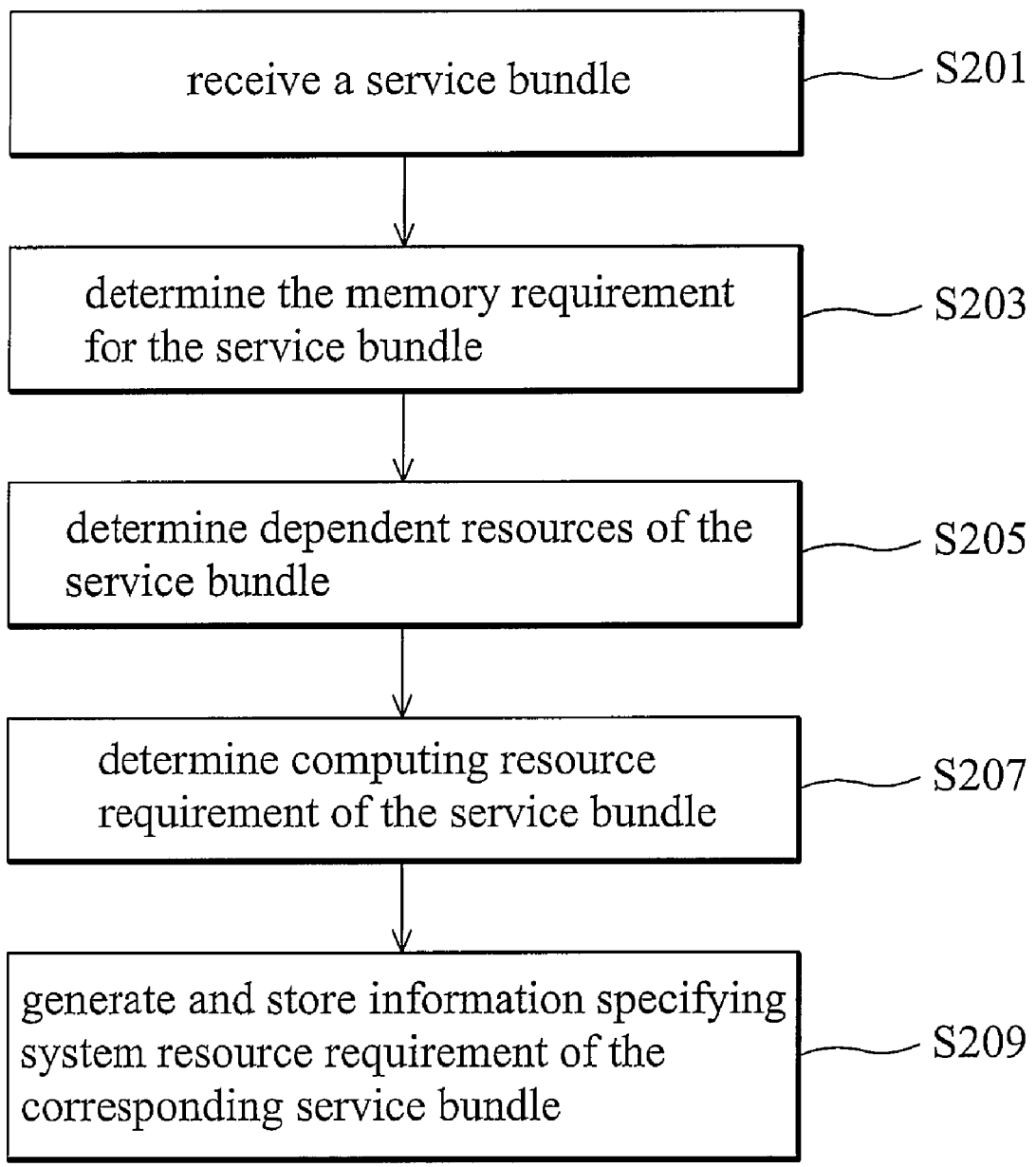
FIG. 2 is a flowchart of an embodiment of a resource management method.

FIG. 2 is a flowchart of an embodiment of a resource management method. The method of FIG. 2 can be implemented in the resource management system 100 of FIG. 1.

In step S201, a service bundle is received. In step S203, the memory requirement for the service bundle is determined. In step S205, dependent resources of the service bundle are determined, comprising input/output device requirement and dependency on other service bundles of the service bundle. In step S207, computing resource requirement of the service bundle is determined, such as a required CPU computing loading of the service bundle.

When a service bundle is provided, the method of FIG. 2 is performed before the service bundle is installed in a service bundle user to determine the system resource requirement for the provided service bundle. The determined results obtained in steps S203~S207 are stored as information specifying system resource requirement of the corresponding service bundle (step S209). When the service bundle is to be installed in a service bundle user, the pre-determined and stored information is used to assess whether available resource of the service bundle user is sufficient for the resource requirement of the service bundle.

Figure 3A:
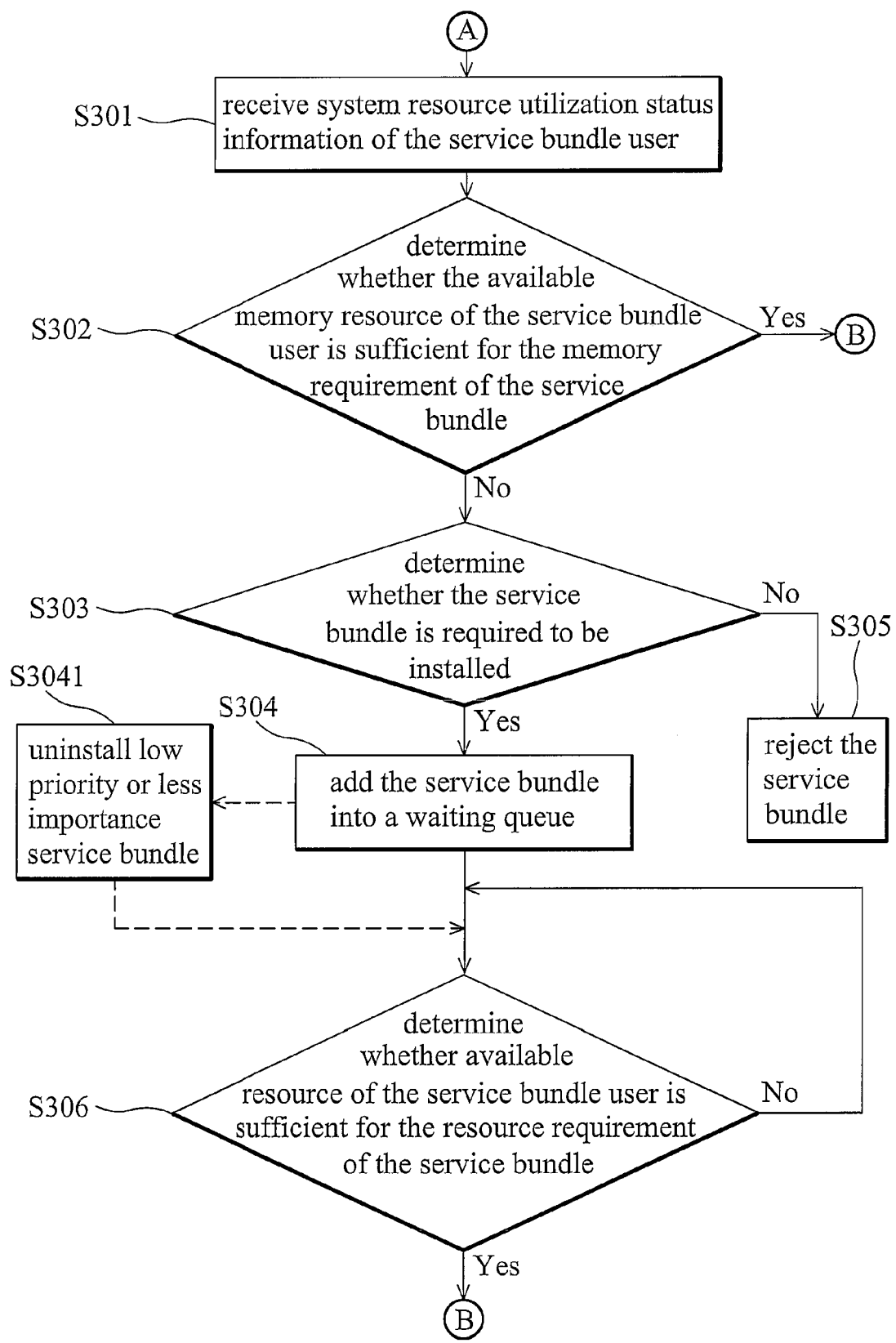
FIGS. 3A~3C are flowcharts of an embodiment of a resource management method.
Figure 3B:
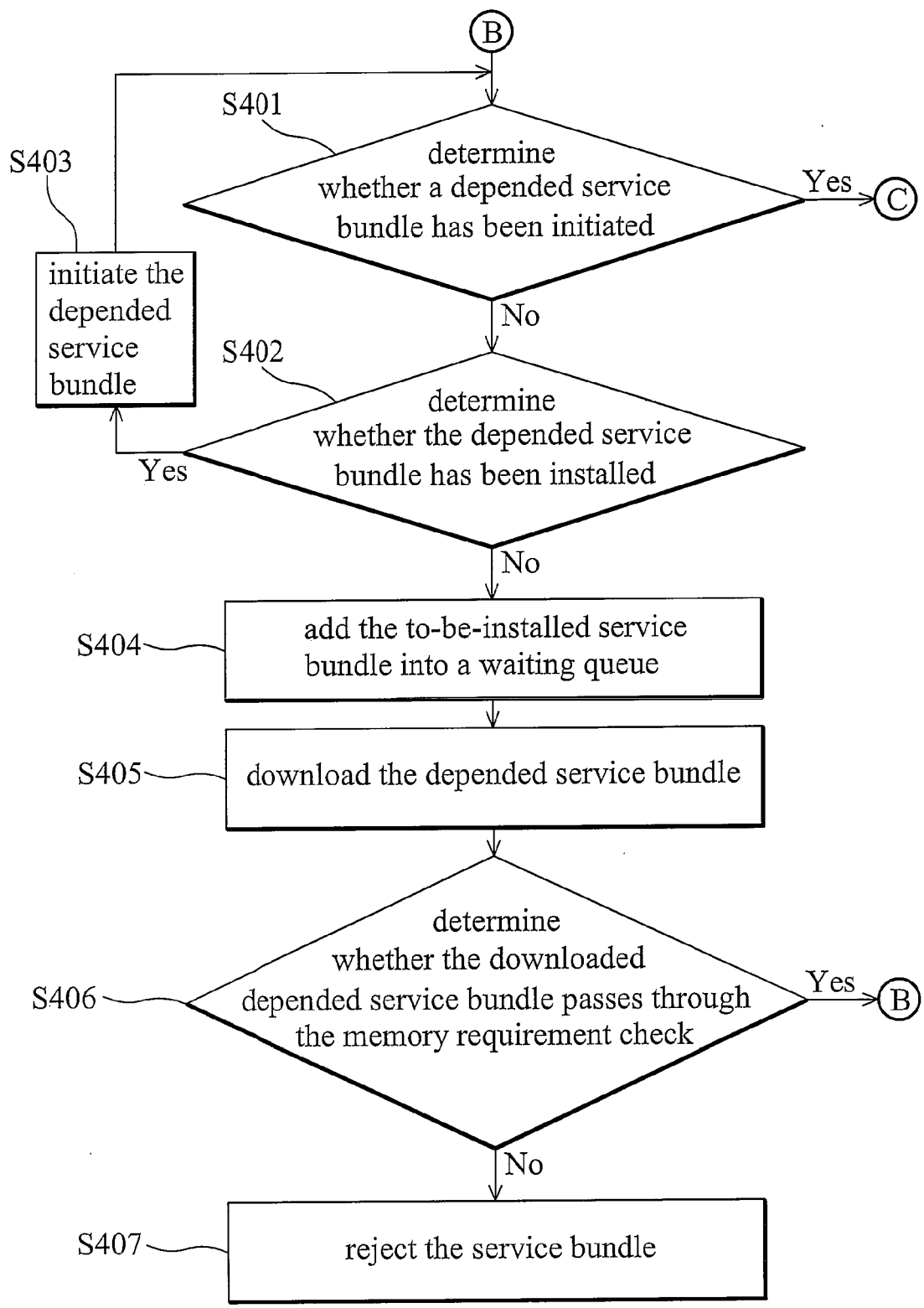
Figure 3C:
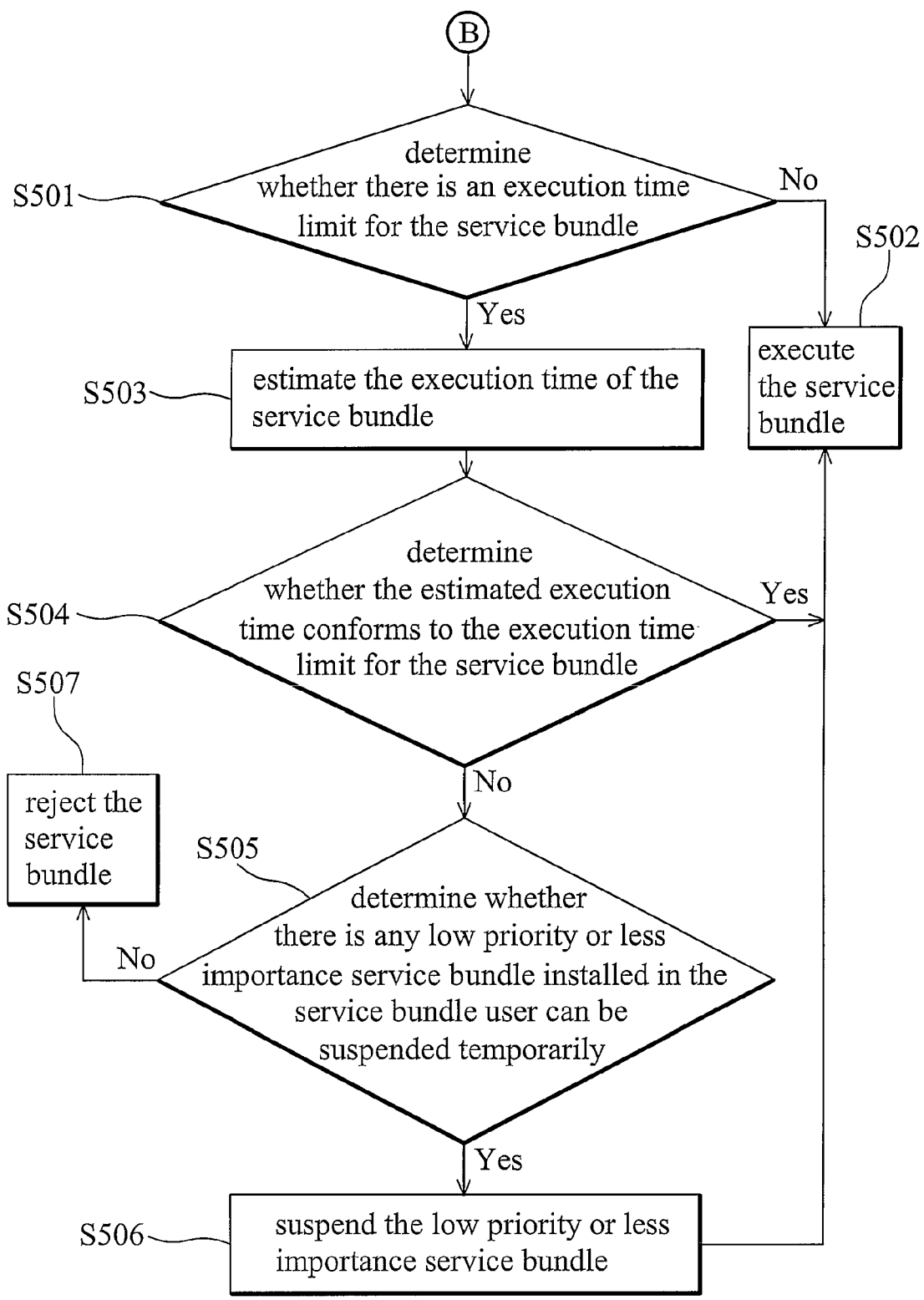

FIGS. 3A~3C are flowcharts of an embodiment of a resource management method.

Referring to FIG. 3A, procedure A is performed to determine whether available memory resource in the service bundle user is sufficient for the service bundle.

In step S301, information of system resource utilization status of the service bundle user is received. The information of system resource utilization status comprises: a list of service bundles which have been installed in the service bundle user, and information specifying total system resources of the service bundle user.

In step S302, it is determined whether the available memory resource of the service bundle user is sufficient for the memory requirement of the service bundle. Each and every service bundle that is to be installed in the service bundle user corresponds to a pre-determined and stored system resource requirement. Accordingly, each service bundle that has been installed in the service bundle user has a corresponding pre-determined and stored system resource requirement. According to the list of service bundles which have been installed in the service bundle user, and the memory requirement recorded in the corresponding pre-determined and stored system resource requirement, a total memory requirement of the service bundles installed in the service bundle user can be calculated. Using the calculated total memory requirement, as well as the memory resource equipped in the service bundle user, available memory resource of the service bundle user can be calculated accordingly. It can be determined whether the available memory resource of the service bundle user is sufficient for the memory requirement of the service bundle by comparing the available memory resource and the memory requirement for the to-be-installed service bundle (which has not been installed yet). When the available memory resource of the service bundle user is insufficient for the memory requirement of the service bundle, the method proceeds to step S303, otherwise, to procedure B.

In step S303, it is determined whether the service bundle is required to be installed, and if so, the method proceeds to step S304, otherwise, to step S305. Here, if the service bundle has been designated to be installed by a user, paid by the user, or has been designated as a requisite, it is determined the service bundle is required to be installed.

In step S304, the service bundle is added into a waiting queue. In step S305, the service bundle is rejected by the service bundle user.

In step S3041, the service bundles been installed in the service bundle user are screened, and among those service bundles, the one marked with a low priority or less importance is uninstalled. If none the service bundles installed in the service bundle user is marked with a low priority or less importance, the step S3041 is skipped.

In step S306, it is determined whether available resource of the service bundle user becomes sufficient for the resource requirement of the service bundle according to a preset period, and if so, the method proceeds to procedure B.

Referring to FIG. 3B, procedure B is used for determining whether the dependent resources of the service bundle are sufficient. In step S401, it is determined whether another service bundle on which the service bundle is depended (hereinafter referred to as "depended service bundle") has been initiated, and if so, the method proceeds to procedure C, otherwise, the method proceeds to step S402. In step S402, it is determined whether the depended service bundle has been installed, and if so, the method proceeds to step S403, otherwise, the method proceeds to step S404. In step S403, the depended service bundle is initiated. In step S404, the to-be-installed service bundle is added into a waiting queue. In step S405, the depended service bundle is downloaded. In step S406, it is determined whether the depended service bundle downloaded in step S405 passes through the memory requirement check of procedure A, and if so, the depended service bundle check (procedure B) is performed against the depended service bundle, otherwise, the method proceeds to step S407. In step S407, the service bundle is rejected by the service bundle user.

Referring to FIG. 3C, procedure C determines whether the computing resource of the service bundle is sufficient. In step S501, it is determined whether there is an execution time limit for the service bundle, and if so, the method proceeds to step S503, otherwise, the method proceeds to step S502. In step S502, the service bundle is executed. In step S503, the execution time of the service bundle is estimated. In step S504, it is determined whether the estimated execution time conforms to the execution time limit for the service bundle, and if so, the method proceeds to step S502, otherwise, the method proceeds to step S505. In step S505, it is determined whether there is any service bundle installed in the service bundle user which is marked with a low priority or less importance and can be suspended temporarily, and if so, the method proceeds to step S506, otherwise, the method proceeds to step S507. In step S506, the service bundle, which is marked with a low priority or less importance, is suspended, and the method proceeds to step S502. In step S507, the service bundle is rejected by the service bundle user.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A resource management method, comprising:
   determining a system resource requirement for a service bundle provided by a service bundle developer and provider, and generating resource requirement information corresponding to the service bundle;
   receiving information of system resource utilization status from a service bundle user;
   determining whether available resource of the service bundle user is sufficient for the resource requirement of the service bundle according to the resource requirement information of the service bundle developer and provider and the information of system resource utilization status of the service bundle user;
   when the available resource of the service bundle user is insufficient for the resource requirement of the service bundle, generating a waiting queue and adding the service bundle into the waiting queue; and
   when the available resource of the service bundle user is sufficient for the resource requirement of the service bundle, installing the service bundle specified in the waiting queue in the service bundle user.

2. The resource management method of claim 1, further determining whether available resource of the service bundle user becomes sufficient for the resource requirement of the service bundle according to a preset period, and when the available resource of the service bundle user is sufficient for the resource requirement of the service bundle, installing the service bundle specified in the waiting queue in the service bundle user.

3. The resource management method of claim 1, wherein the service bundle user comprises an open service platform.

4. The resource management method of claim 3, wherein the service bundle user comprises an OSGi (Open System Gateway initiative) platform.

5. The resource management method of claim 1, wherein the step of determining the system resource requirement for the service bundle provided by the service bundle developer and provider comprises:
   determining a memory requirement for the service bundle;
   determining dependent resources of the service bundle, comprising input/output device requirement and dependency on other service bundles of the service bundle; and
   determining computing resource requirement of the service bundle.

6. The resource management method of claim 5, further generating information specifying resource requirement, comprising information specifying memory requirement, input/output device requirement and dependency on other service bundles, and computing resource requirement of the service bundle.

7. The resource management method of claim 1, wherein the step of receiving the information of system resource utilization status from the service bundle user comprises:
   receiving a list of service bundles which have been installed in the service bundle user; and
   receiving information specifying total system resources of the service bundle user.

8. A resource management system, implemented between a service bundle developer and provider and a service bundle user, comprising:
   a resource requirement determining device, determining a system resource requirement for a service bundle provided by the service bundle developer and provider, and generating resource requirement information corresponding to the service bundle;
   a processor, receiving information of system resource utilization status from the service bundle user, determining whether available resource of the service bundle user is sufficient for the resource requirement of the service bundle according to the resource requirement information of the service bundle developer and provider and the information of system resource utilization status of the service bundle user, when the available resource of the service bundle user is insufficient for the resource requirement of the service bundle, generating a waiting queue and adding the service bundle into the waiting queue, and when the available resource of the service bundle user is sufficient for the resource requirement of the service bundle, installing the service bundle specified in the waiting queue in the service bundle user; and a storage device, storing the waiting queue and the corresponding system resource requirement.

9. The resource management system of claim 8, wherein the processor further determines whether available resource of the service bundle user becomes sufficient for the resource requirement of the service bundle according to a preset period, and when the available resource of the service bundle user is sufficient for the resource requirement of the service bundle, installs the service bundle specified in the waiting queue in the service bundle user.

10. The resource management system of claim 8, wherein the service bundle user comprises an open service platform.

11. The resource management system of claim 10, wherein the service bundle user comprises an OSGi (Open System Gateway initiative) platform.

12. The resource management system of claim 8, wherein the resource requirement determining device further determines a memory requirement for the service bundle, determines input/output device requirement and dependency on other service bundles of the service bundle, and determines computing resource requirement of the service bundle.

13. The resource management system of claim 12, wherein the resource requirement determining device further generates information specifying resource requirement, comprising information specifying memory requirement, input/output device requirement and dependency on other service bundles, and computing resource requirement of the service bundle.

14. The resource management system of claim 8, wherein the processor further receives a list of service bundles which have been installed in the service bundle user, and receives information specifying total system resources of the service bundle user.

* * * * *